US008508310B2

(12) United States Patent
Froidevaux

(10) Patent No.: US 8,508,310 B2
(45) Date of Patent: Aug. 13, 2013

(54) METHOD AND DEVICE FOR GENERATING PWM SIGNALS

(75) Inventor: Claude Froidevaux, La Chaux-de-Fonds (CH)

(73) Assignee: Etel S.A., Motiers (CH)

( * ) Notice: Subject to any disclaimer, the term of this patent is extended or adjusted under 35 U.S.C. 154(b) by 322 days.

(21) Appl. No.: 12/999,002

(22) PCT Filed: Mar. 26, 2009

(86) PCT No.: PCT/EP2009/002196
§ 371 (c)(1),
(2), (4) Date: Dec. 14, 2010

(87) PCT Pub. No.: WO2009/156015
PCT Pub. Date: Dec. 30, 2009

(65) Prior Publication Data
US 2011/0102041 A1     May 5, 2011

(30) Foreign Application Priority Data
Jun. 27, 2008 (DE) .................. 10 2008 030 527

(51) Int. Cl.
*H03K 7/08* (2006.01)
*H02M 3/335* (2006.01)
(52) U.S. Cl.
USPC ............... 332/109; 327/175; 363/41; 363/17; 363/19
(58) Field of Classification Search
USPC ............ 332/109; 363/41, 17, 19; 327/175
See application file for complete search history.

(56) References Cited

U.S. PATENT DOCUMENTS

| | | | |
|---|---|---|---|
| 5,070,312 A * | 12/1991 | Cho ......................... | 332/109 |
| 6,594,308 B1 | 7/2003 | Galbiati et al. | |
| 7,301,488 B2 | 11/2007 | Leung et al. | |
| 2006/0227860 A1 | 10/2006 | Leung et al. | |
| 2007/0153890 A1 | 7/2007 | Huber et al. | |

FOREIGN PATENT DOCUMENTS

| | | |
|---|---|---|
| DE | 10 2005 061 388 | 6/2007 |
| EP | 1 014 552 | 6/2000 |

OTHER PUBLICATIONS

International Search Report, PCT International Application No. PCT/EP2009/002196, dated Jun. 18, 2009.
Yan-Fei Liu et al., "Digital control of switching power converters," *IEEE*, p. 635-640, 2005.
DS90CR286, "+3.3V Rising Edge Data Strobe LVDS 28-Bit Channel Link-66 MHz," *National Semiconductor Corp.*, Nov. 2000.

* cited by examiner

*Primary Examiner* — Arnold Kinkead
(74) *Attorney, Agent, or Firm* — Kenyon & Kenyon LLP

(57) ABSTRACT

A PWM signal for driving power transistors of a half-bridge of a converter is generated with the aid of a digital circuit, in which an internal reference value is compared to the counter content of a counting ramp. In this context, a logic state of the PWM signal depends upon whether the internal reference value is greater than the counter content of the counting ramp. After each comparison between the internal reference value and the counter content, an n-bit long data word dependent on the result of this comparison is output serially as PWM signal, n being greater than or equal to 2. The resolution of the PWM signal is thereby improved by the factor n in comparison to conventional systems, without markedly increasing the circuit expenditure.

9 Claims, 5 Drawing Sheets

FIG. 6

| R [real] | R [bin] | W |
|---|---|---|
| 0.0000 | 0000 | 0000000000000000 |
| 0.0625 | 0001 | 1000000000000000 |
| 0.1250 | 0010 | 1100000000000000 |
| 0.1875 | 0011 | 1110000000000000 |
| 0.2500 | 0100 | 1111000000000000 |
| 0.3125 | 0101 | 1111100000000000 |
| 0.3750 | 0110 | 1111110000000000 |
| 0.4375 | 0111 | 1111111000000000 |
| 0.5000 | 1000 | 1111111100000000 |
| 0.5625 | 1001 | 1111111110000000 |
| 0.6250 | 1010 | 1111111111000000 |
| 0.6875 | 1011 | 1111111111100000 |
| 0.7500 | 1100 | 1111111111110000 |
| 0.8125 | 1101 | 1111111111111000 |
| 0.8750 | 1110 | 1111111111111100 |
| 0.9375 | 1111 | 1111111111111110 |

METHOD AND DEVICE FOR GENERATING PWM SIGNALS

FIELD OF THE INVENTION

The present invention relates to a method and a device for generating PWM signals. Such PWM signals are used to drive power transistors in a converter.

As described, for example, in German Published Patent Application No. 10 2005 061 388, a converter is used to convert the direct voltage of an intermediate circuit into a three-phase alternating current for driving an electric motor having three motor phases.

Quite generally, with the aid of the PWM signals, a converter is intended to set a selected voltage in one motor phase as precisely as possible. Naturally, in so doing, it is advantageous if the voltage can be very finely predefined. However, in a digital converter, this means that digital counters must be operated with very high clock frequencies, which sometimes leads to circuit-engineering problems, or at least to a very high circuit-engineering expenditure.

SUMMARY

Example embodiments of the present invention provide a method and a device for generating PWM signals which make it possible to preset the voltage very finely using affordable digital circuits, without requiring exceptionally high clock frequencies of the digital counter in so doing.

A PWM signal for driving the power transistors of a half-bridge of a converter is generated with the aid of a digital circuit in which an internal reference value is compared to a counter content of a counting ramp. In this context, a logic state of the PWM signal depends upon whether the internal reference value is greater than the counter content of the counting ramp. According to example embodiments of the present invention, after each comparison between the internal reference value and the counter content, an n-bit long data word dependent on the result of this comparison is output serially as a PWM signal, n being greater than or equal to 2.

By the generation and serial output of the suitably formed data word, the resolution of the PWM signal in the case of a given value range and counter clock pulse of the counting ramp may be increased approximately by the factor n, without the circuit-engineering requirements rising substantially. Namely, serializer-type converters for the rapid serial output of data words—coupled to a slower clock pulse—are conveniently available as standard modules.

Further advantages of example embodiments of the present invention and details pertaining thereto are below with reference to the figures.

BRIEF DESCRIPTION OF THE DRAWINGS

FIG. 6 shows a table for the selection of suitable data words.

DETAILED DESCRIPTION

Figure 1:
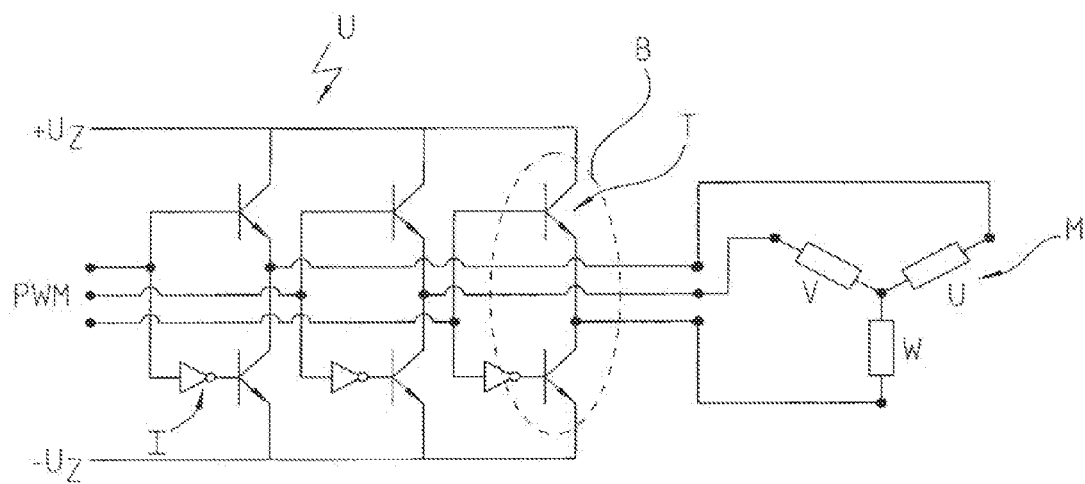
FIG. 1 shows a conventional converter.

FIG. 1 shows a circuit diagram of a converter U as described, for example, in German Published Patent Application No. 10 2005 061 388 mentioned above. Each motor phase U, V, W of an electric motor M is connected either to the positive intermediate-circuit voltage +Uz or to the negative intermediate-circuit voltage −Uz by half-bridge circuits B having two power transistors T each. To that end, a logic PWM signal PWM is applied to each half-bridge B made up of two series-connected power transistors T, in each case one power transistor being driven directly, the other via an inverter I. In this manner, each motor phase is either at +Uz (logic 1) or at −Uz (logic 0), depending on the logic level of the respective PWM signal. It should be noted that, when switching between +Uz and −Uz, a brief dead time must be observed during which both power transistors T of a half-bridge B are non-conductive, in order to avoid a short circuit of the intermediate-circuit voltage.

Figure 2:
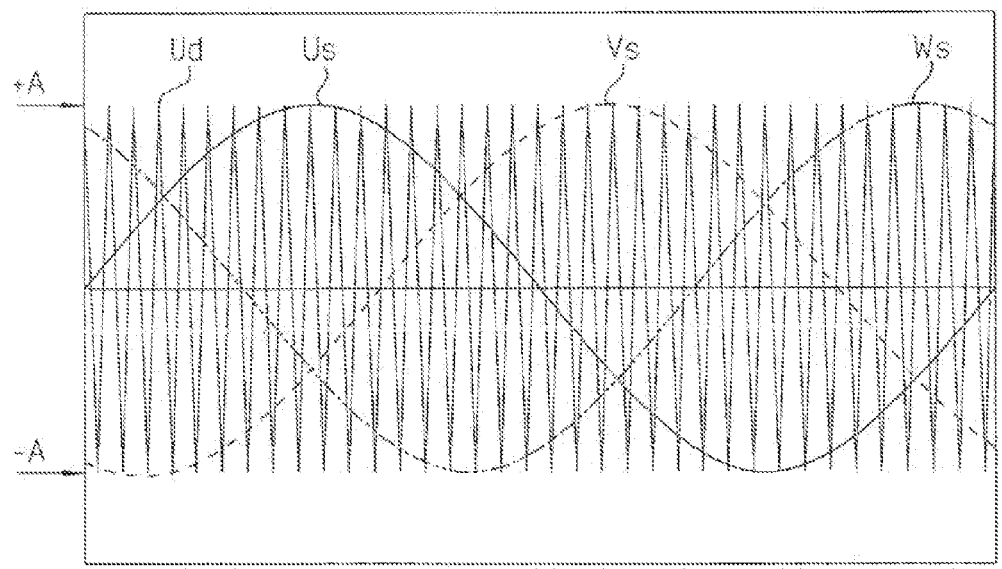
FIG. 2 shows a delta voltage and control voltages in accordance with a conventional PWM method.

One possibility for generating PWM signals is shown in simplified terms in FIG. 2. The PWM signals are pulse-width-modulated, square-wave signals. For each motor phase U, V, W, a delta voltage Ud is compared to a control voltage Us, Vs, Ws. For example, if control voltage Vs lies above delta voltage Ud, then PWM signal PWM for motor phase V is logic 1, and motor phase V is connected to positive intermediate-circuit voltage +Uz. If the control voltage lies below the delta voltage, then the associated PWM signal is logic 0, and the associated motor phase is connected to negative intermediate-circuit voltage −Uz. Thus, the higher the control voltage, the longer the respective motor phase is connected to +Uz, and vice versa. The average voltage applied to the specific motor phase is thus adjusted via the pulse duty factor of the PWM signal.

The higher the frequency of delta voltage Ud, also known as PWM-frequency, lies, the better the voltage in the motor phase, predefined by the control voltage, can be adjusted by pulse width modulation. Higher PWM-frequencies result in a more rapid attainment of the necessary motor currents as well as a decrease in current ripple and a decrease in eddy current losses associated with it.

Figure 3:
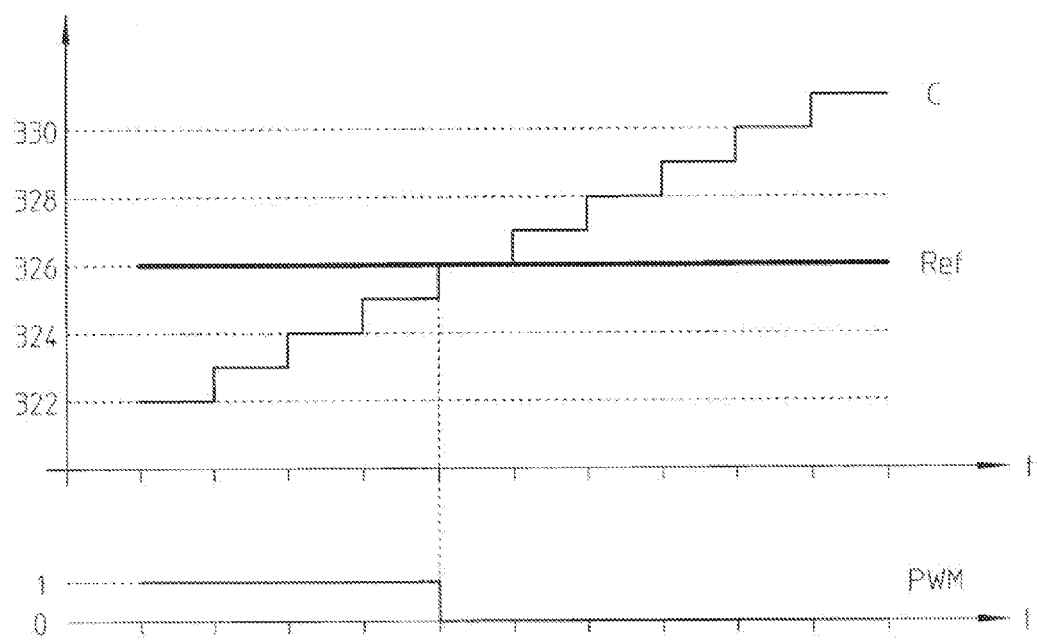
FIG. 3 shows a counting ramp and a reference value in accordance with a conventional digital PWM method.

As indicated in FIG. 3, in digitally controlled converters, the analog delta signal of FIG. 2 is replaced by a counting ramp C. The control voltage is predefined as variable, digital reference value Ref, the value range of the reference value agreeing more or less with the value range of the counting ramp, but being somewhat smaller. In the example of FIG. 3, PWM signal PWM is a logic "1" so long as reference value Ref is smaller than counting ramp C (or more precisely: than the counter content of counting ramp C), and otherwise a logic "0". The logic state of PWM signal PWM is thus a function of the comparison of reference value Ref to counting ramp C.

The quality of PWM signals PWM generated is now a function of the counting frequency and the value range of counting ramp C. If the desire is to increase the quality, counters having a larger value range and therefore a higher counting frequency are needed. Both measures increase the demands on the electronic equipment used considerably.

Figure 4:
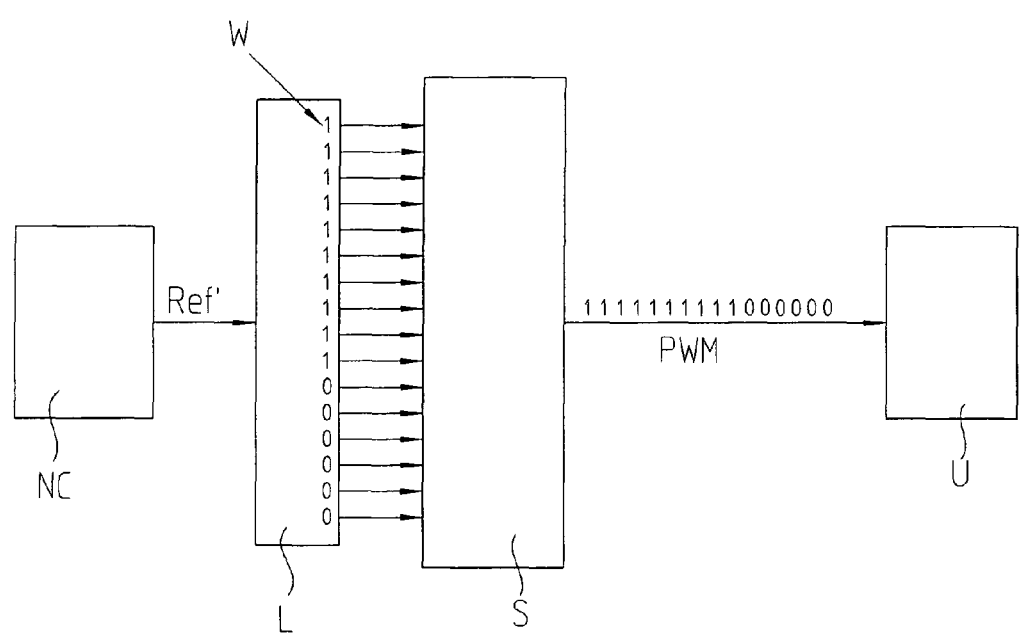
FIG. 4 shows a device for generating PWM signals.

FIG. 4 schematically illustrates a device for generating PWM signals which has been improved according to an example embodiment of the present invention. A control NC generates a reference value Ref' which corresponds to reference value Ref of FIG. 3, but which possesses a larger value range. This reference value Ref' is processed in a logic circuit L. In so doing, a data word W is generated, which is output serially as PWM signal PWM via a serializer-type converter S to converter U.

Since, in spite of the larger value range of reference value Ref' of control NC, counting ramp C integrated in logic circuit L is not intended to count more rapidly, the value range of counting ramp C remains unchanged and is therefore smaller than the value range of Ref'.

It is not reference value Ref' of control NC which is then utilized for the comparison to counting ramp C, but rather the integer component of a division of reference value Ref' by a whole number n:

Ref=int(Ref'/n);

where Ref is the reference value utilized for the comparison to counting ramp C, Ref' is the reference value supplied by control NC and having a value range n-fold greater compared to Ref, and n is a whole number greater than or equal to 2. Accordingly, reference value Ref' supplied by control NC could also be referred to as external reference value Ref', and reference value Ref derived from it as internal reference value Ref.

The comparison of this internal reference value Ref thus formed to the counter content of a counting ramp C ultimately decides on the logic state of PWM signal PWM. However, as a result of this comparison, data word W is now generated, which has a length of n bits. This data word W is subsequently output serially as PWM signal by serializer-type converter S. For example, such serializer-type converters S are widespread as SERDES modules. They require only a slow, external clock pulse, and are able to synchronize the rapid serial output to this slow clock pulse, for instance, using a customary PLL circuit. Thus, it is possible to output data word W completely during one counting pulse of counting ramp C, if serializer-type converter S is synchronized with the clock pulse of counting ramp C. An example for a module is the DS90CR285 from the firm National Semiconductor. In the simplest case, a suitable serializer-type converter S has a shift register that once per parallel clock pulse, accepts one data word W having n bits and outputs it in the n-fold faster serial clock pulse.

Figure 5:
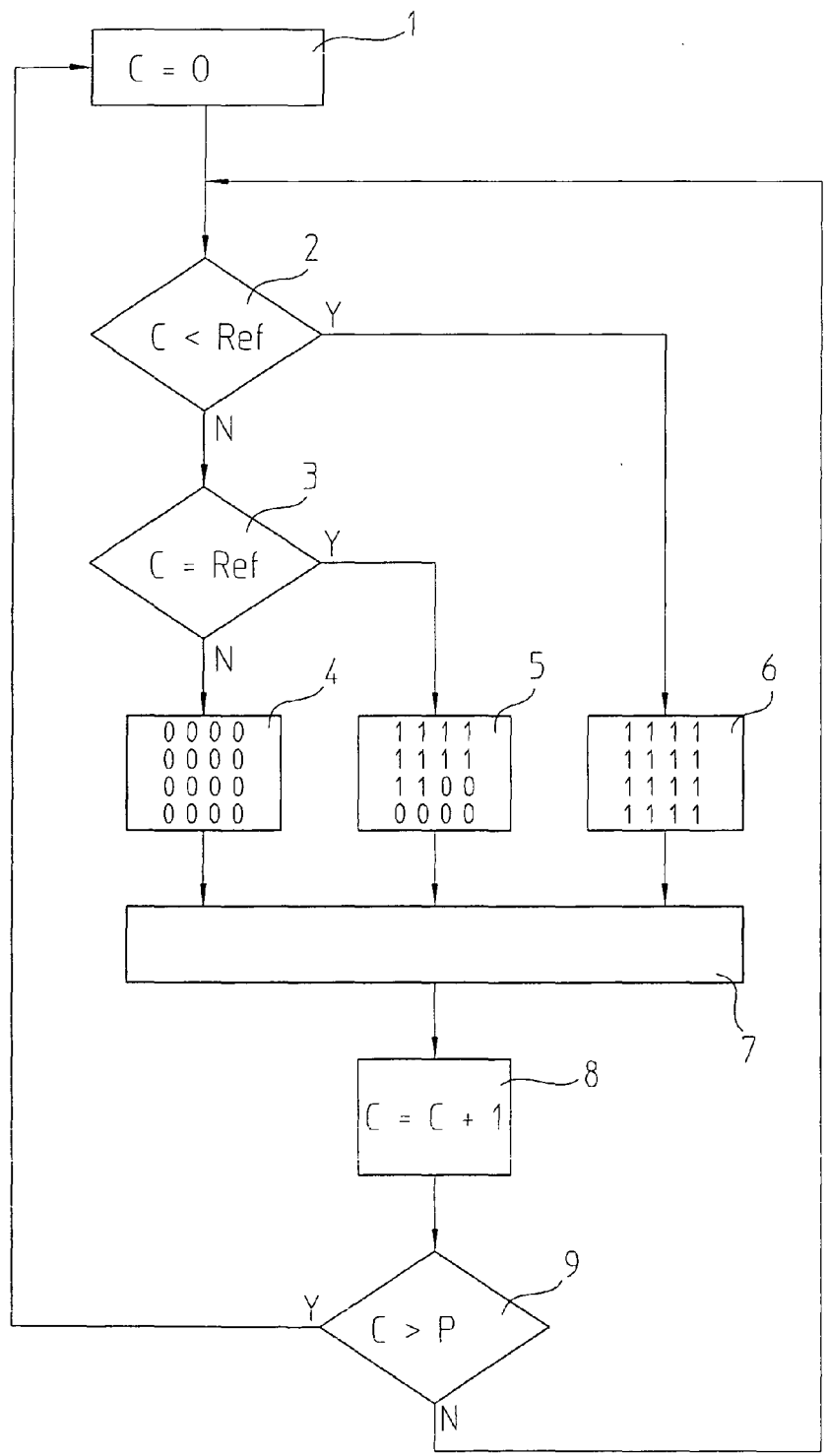
FIG. 5 shows a flow chart for a method to generate PWM signals.

With the aid of a flow chart, FIG. 5 explains the functioning method of logic circuit L in which data word W is generated.

In step 1, counting ramp C is initialized, thus, for example, is set to 0.

In step 2, it is checked whether counting ramp C (i.e., its counter content) is smaller than internal reference value Ref which, as described above, is derived from external reference value Ref' predefined by control NC. If this is the case, in step 6, a data word W is generated made up only of logic "1". If this is not the case, then the method branches to step 3.

In step 3, it is checked whether the counter content of the counting ramp corresponds just exactly to internal reference value Ref. If this is not the case, then in step 4, a data word W is generated made up only of logic "0". However, If this is the case, then the method branches to step 5.

In step 5, a data word W is generated that is made up partly of logic "1" and partly of logic "0". The manner in which data word W comes about in step 5 is explained in greater detail below.

In step 7, data word W is output serially via serializer-type converter S, the serializer-type converter being synchronized with counting ramp C by a PLL circuit, for example. One data word W is output serially during each counting step of counting ramp C.

In step 8, the counting ramp is incremented; in step 9, it is checked whether limit value P of counting ramp C is already exceeded. If this is not yet the case, the method branches to step 2, otherwise to step 1 in which the counting ramp is reset to the initial value.

In this context, counting ramp C may be run through in ascending fashion as described here, but also in descending fashion, or even ascending and descending in alternation, which most closely corresponds to the delta voltage in the analog method for generating PWM signals described with reference to FIG. 2.

How data word W comes about in step 5 shall now be explained in greater detail. If n is the length of data word W (thus n=16 in the present example) and counting ramp C runs from 0 to P (let us say P=63 in the example), conventionally, an external reference value between 0 and 63 would be possible (values close to the limits being ruled out for technical reasons, not important here). According to example embodiments of the present invention, high-resolution, external reference values Ref' between 0 and 1023 are now possible. Thus, this refines the resolution of the PWM signal by the factor n.

As explained above, it is not this high-resolution, external reference value Ref' supplied by control NC which is considered in steps 2 and 3, but rather the integer component of the quotient of high-resolution, external reference value Ref' and n, thus, an internal reference value Ref first formed in logic circuit L. Only in step 5, thus when this integer component or internal reference value Ref is equal to the counter content of counting ramp C, is remainder R of the division of high-resolution, external reference value Ref' by n considered. For remainder R, it holds that:

$R=(\text{Ref}'/n)-\text{int}(\text{Ref}'/n)$ and thus $R=(\text{Ref}'/n)-\text{Ref}.$ In FIG. 6, the n=16 possible values for this remainder R are indicated in decimal (R[real]) and binary (R[bin]) representation in a table. Thus, in step 5, a data word W is selected on the basis of remainder R of the division of high-resolution, external reference value Ref' by the length of data word n. The closer this remainder R is to zero, the fewer bits of logic "1" are contained in data word W.

If the data word includes bits of logic state "1", then—in the case of counting ramp C run through in ascending fashion as shown in FIG. 3—they must be output serially at the beginning via serializer-type converter S, thus, are located at the start of data word W. In the same manner, all bits of logic state "0" are located at the end of data word W, as can be gathered from FIG. 6. However, if counting ramp C is run through in descending fashion, then this order must be reversed.

In the final analysis, the result of the device according to example embodiments of the present invention for generating PWM signals is that, in the range in which, up to remainder R, counting ramp C agrees with internally formed reference value Ref, the higher resolution of external reference value Ref' supplied by control NC is used to set the switchover instant of the PWM signal more precisely than would be possible using the clock pulse of counting ramp C.

This is made possible by the suitable selection of data word W, in which the transition from logic "1" to logic "0" is determined in accordance with remainder R, as well as by the rapid output of this data word W, synchronized with the counting pulse, as PWM signal during one counting pulse of counting ramp C.

Using a counting ramp which counts with an easily controllable 100 MHz, for n=16, a PWM signal is able to be generated with the method and the device described herein whose resolution could only be achieved with a counting frequency of 1.6 GHz using a conventional device and a method. At present, such high counting frequencies can only be achieved with great expenditure for circuit engineering.

What is claimed is:

1. A method for generating a PWM signal with the aid of a digital circuit to drive power transistors of a half-bridge of a converter, comprising:
    comparing an internal reference value to a counter value of a counting ramp, a logic state of the PWM signal being dependent upon whether the internal reference value is greater than the counter value of the counting ramp; and
    after each comparison between the internal reference value and the counter value, serially outputting as the PWM signal an n-bit long data word dependent on the result of the comparison, n being greater than or equal to 2;
    wherein the internal reference value is derived from an external reference value, the internal reference value being an integer component of a quotient of the external reference value and n.

2. The method according to claim herein the data word is made up exclusively of bits of a first logic value, if the counter value is smaller than the internal reference value.

3. The method according to claim 2, wherein the data word is made up exclusively of bits of a second logic value, if the counter value is greater than the internal reference value.

4. The method according to claim 1, wherein if the internal reference value and the counting ramp are equal, a data word is output serially whose portions of bits of a first and second logic value are a function of a remainder of a division of the external reference value by n.

5. The method according to claim 4, wherein the greater the remainder, the more bits of the first logic value the data word contains.

6. The method according to claim 4, wherein at first all bits of the first logic value in the data word are output serially, and only then all bits of the second logic value, if the counting ramp is run through in ascending fashion.

7. The method according to claim 4, wherein at first all bits of the second logic value in the data word are output serially, and only then all bits of the first logic value, if the counting ramp is run through in descending fashion.

8. The method according to claim 1, wherein the serial output of the data word is synchronized with the counting ramp, so that one complete data word W is output during one clock pulse of the counting ramp.

9. A device for generating a PWM signal with the aid of a digital circuit in order to drive power transistors of a half-bridge of a converter, comprising:
    a comparison device adapted to compare an internal reference value to a counter value of a counting ramp, a logic state of the PWM signal being dependent upon whether the internal reference value is greater than the counter value of the counting ramp; and
    a serializer-type converter adapted to serially output, after each comparison between the internal reference value and the counter value, an n-bit long data word dependent on a result of the comparison as the PWM signal, n being greater than or equal to 2;
    wherein the internal reference value is derived from an external reference value, the internal reference value being an integer component of a quotient of the external reference value and n.

* * * * *